US005124929A

United States Patent [19]

Arlt

[11] Patent Number: 5,124,929

[45] Date of Patent: Jun. 23, 1992

[54] CONTROL CIRCUIT FOR CONTROLLING THE MOVEMENT OF A BLADE

[76] Inventor: Gerhard Arlt, Pestalozzistrasse 11, Augsburh, D-8900, Fed. Rep. of Germany

[21] Appl. No.: 302,688

[22] PCT Filed: May 5, 1988

[86] PCT No.: PCT/EP88/00372

§ 371 Date: Jan. 19, 1989

§ 102(e) Date: Jan. 19, 1989

[87] PCT Pub. No.: WO88/09248

PCT Pub. Date: Dec. 1, 1988

[30] Foreign Application Priority Data

May 19, 1987 [DE] Fed. Rep. of Germany ....... 3716704

[51] Int. Cl.[5] ............................................ G06F 15/46

[52] U.S. Cl. .......................... 364/474.09; 364/474.31; 364/167.01

[58] Field of Search ...................... 364/474.09, 474.31, 364/513, 474.01, 468, 474.3, 474.12, 577, 167.01, 470; 83/76.1, 76.8, 76.9

[56] References Cited

U.S. PATENT DOCUMENTS

| | | | |
|---|---|---|---|
| 3,969,615 | 7/1976 | Bowers et al. | 318/573 X |
| 4,262,336 | 4/1981 | Pritchard | 364/474.31 |
| 4,415,978 | 11/1983 | Craemer et al. | 364/474.09 |
| 4,493,032 | 1/1985 | Johnson | 364/169 |
| 4,704,688 | 11/1987 | Kamata | 364/474.31 |
| 4,829,219 | 5/1989 | Penkar | 364/513 X |

FOREIGN PATENT DOCUMENTS 645288 9/1981 Switzerland .

*Primary Examiner*—Jerry Smith
*Assistant Examiner*—Paul Gordon
*Attorney, Agent, or Firm*—Antonelli, Terry, Stout & Kraus

[57] ABSTRACT

A control circuit for controlling a blade has a subdivision circuit (31) which subdivides the length of a separating cut into linear sections ($W_2$, $W_3$) and sinusoidal sections ($W_1$). The sinusoidal sections are subdivided in a division circuit (31) into longitudinal increments ($\Delta x$). The locus of a sinusoidal partial section is stored in a unit scale in a store (31). The transverse increment corresponding to each longitudinal increment ($\Delta x$) is determined in a unit scale by interpolation, and this transverse increment is multiplied in a multiplier (33) by the amplitude (U) of the separating cut. The actual transverse increments ($\Delta y$) thus obtained are stored consecutively in a second store (35). A synchronizing and sequential circuit (37) feeds the transverse increments ($\Delta y$) stored in the second store (35) to a first motor control circuit (38) which controls the motor for the transverse movement of the blade carrier. The motor (27) for the rotary movement of the blade arranged on the blade carrier is controlled by a second motor control circuit (36), to which the transverse increments ($\Delta y$) are also fed, but in a sequence which corresponds to the first mathematical derivative of the sequence fed to the first motor control circuit.

10 Claims, 5 Drawing Sheets

CONTROL CIRCUIT FOR CONTROLLING THE MOVEMENT OF A BLADE

This invention relates to a control circuit for controlling the linear transverse movement and the rotary movement of a blade according to the preamble of claim 1.

The German Patent 33 36 145 describes a device for manufacturing plastic bags in which a cutting blade effects a longitudinal undulatory separating cut in a continuous foil tubing web. This undulatory separating cut consists of sinusoidal curve pieces as well as straight sections. The device has a cutter head carrying the blade which can be moved in a guide tranversally to the longitudinal movement of the foil tubing web and can be rotated about an axis extending transversally to the guide. On the side opposite the blade, the cutter head has a guide pin which engages into the groove of a drum controller whose axis of rotation extends parallel to the guide. This groove determines the position of the blade in transverse direction as well as the rotating position of the blade. In this case, the rotating position of the blade is supposed to be approximately tangential to the curve piece to be cut of the longitudinally extending undulatory separating cut. Since plastic bags have different transverse dimensions and even the amplitude of the separating cut is different from bag to bag, it is necessary to supply drum controllers whose control groove is adapted to the respective width of the bag and the amplitude of the undulatory separating cut. This requires that a number of drum controllers and their spare parts be kept in stock if separating cuts for different plastic bags are to be manufactured.

It is the object of the invention to provide a control circuit of the above-noted type with which it is possible to cut longitudinally extending, repeating separating cut curves in webs whose longitudinal and transverse dimensions can be easily altered.

Figure 1:
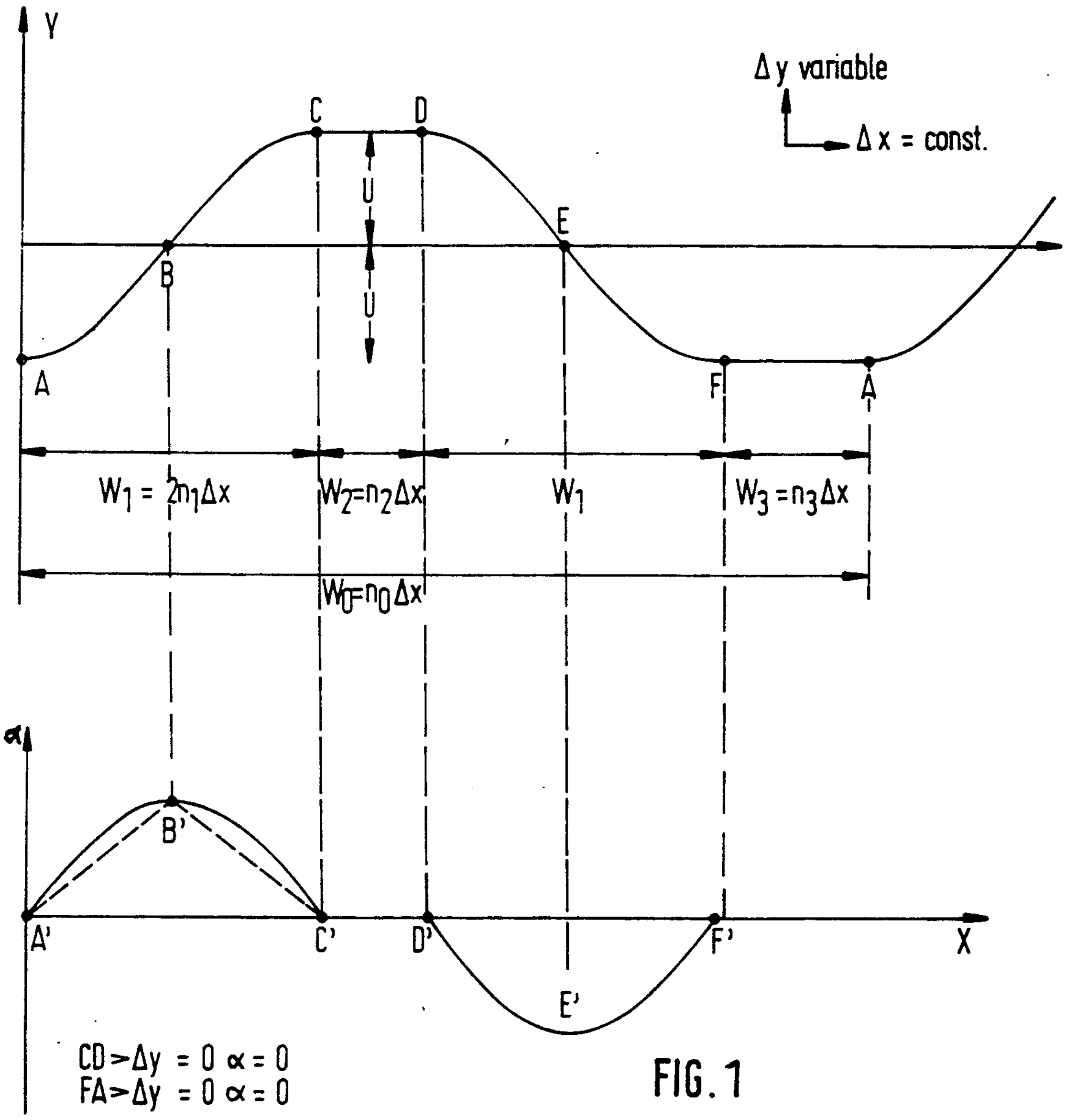
Figure 2:
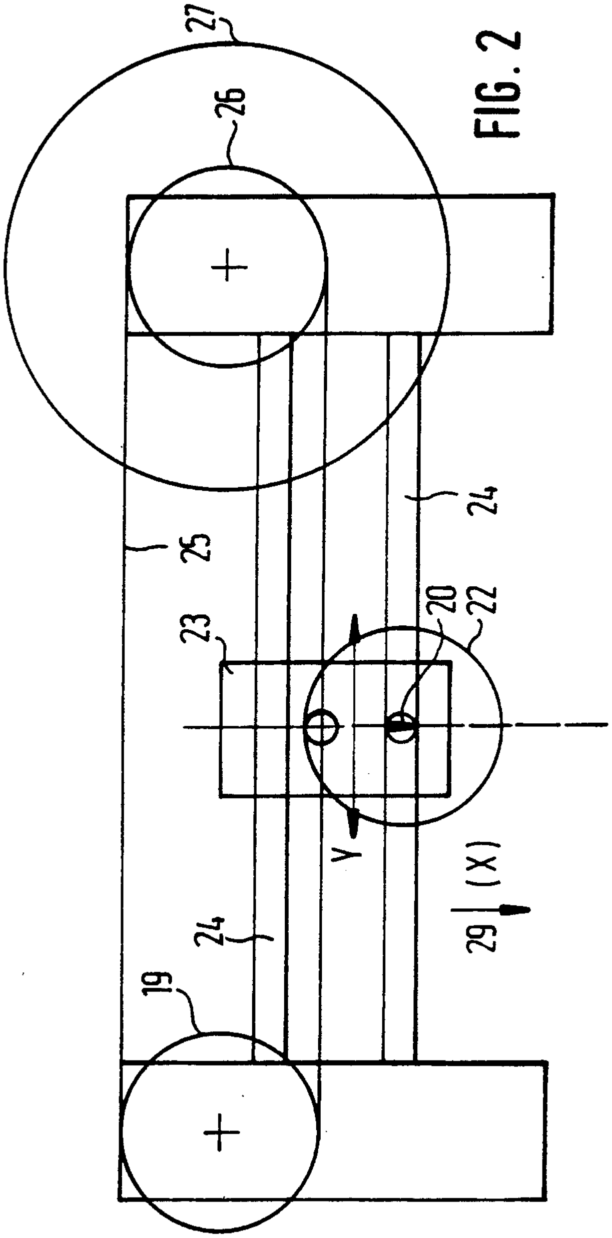
Figure 3:
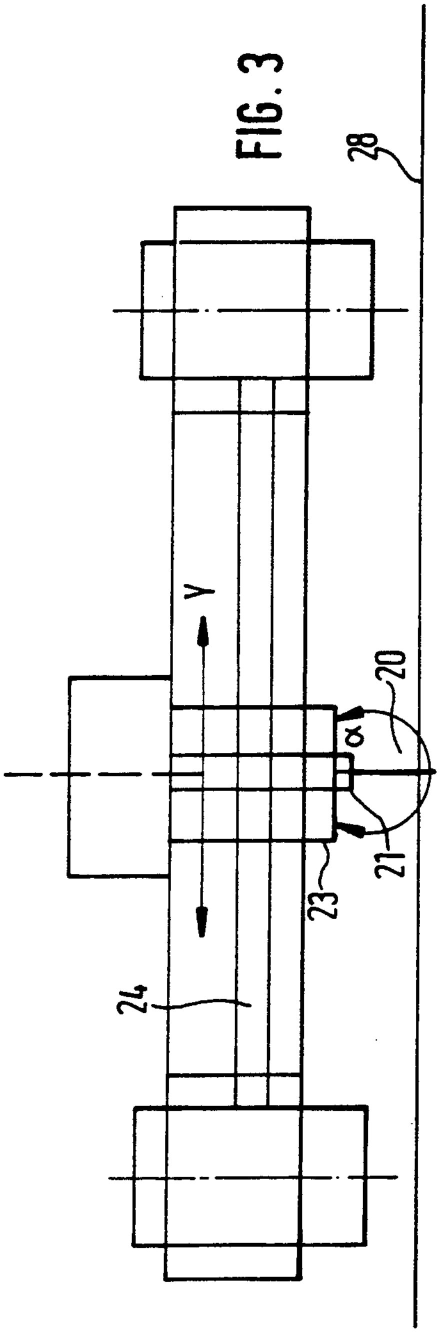
Figure 4:
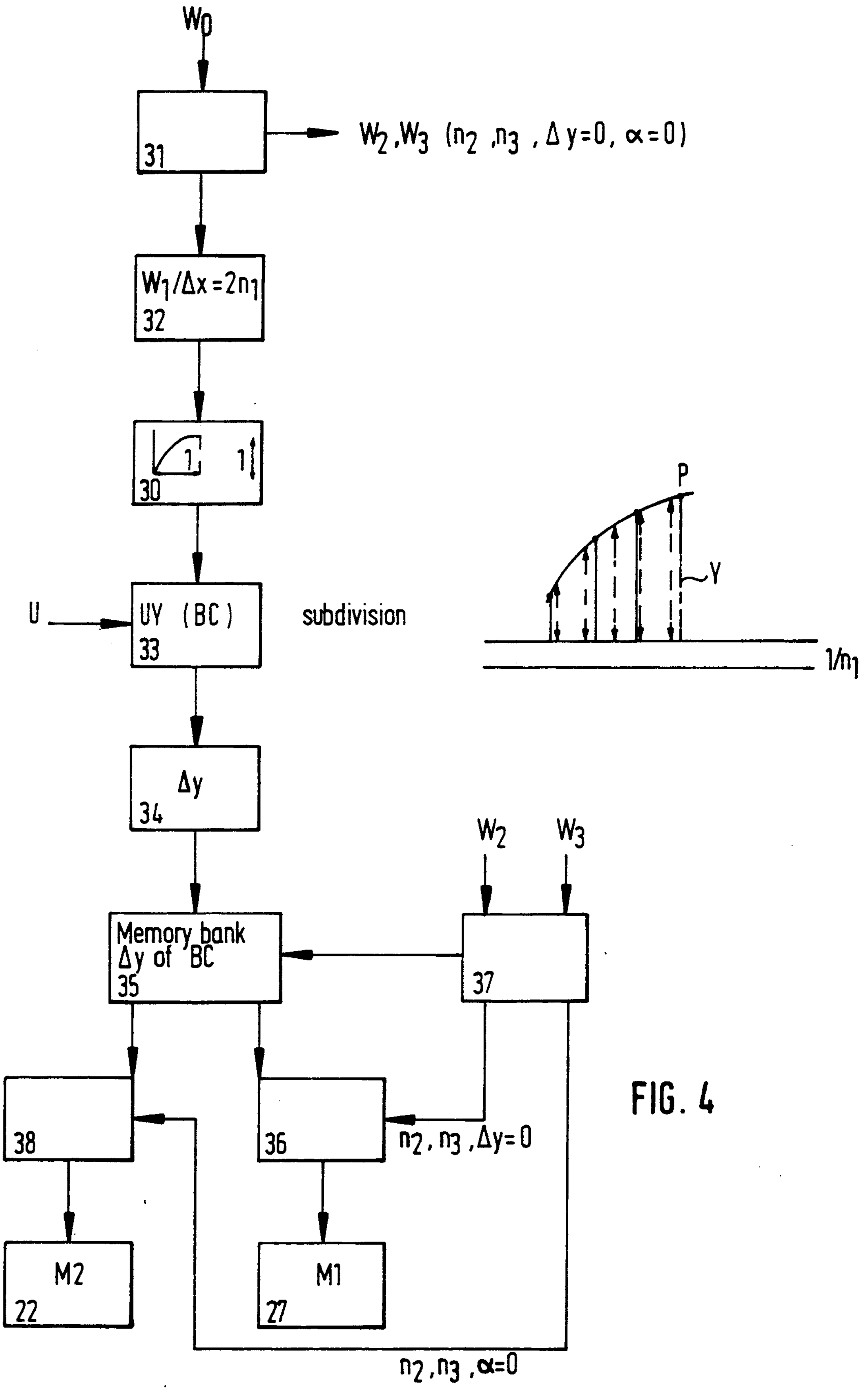
Figure 5:
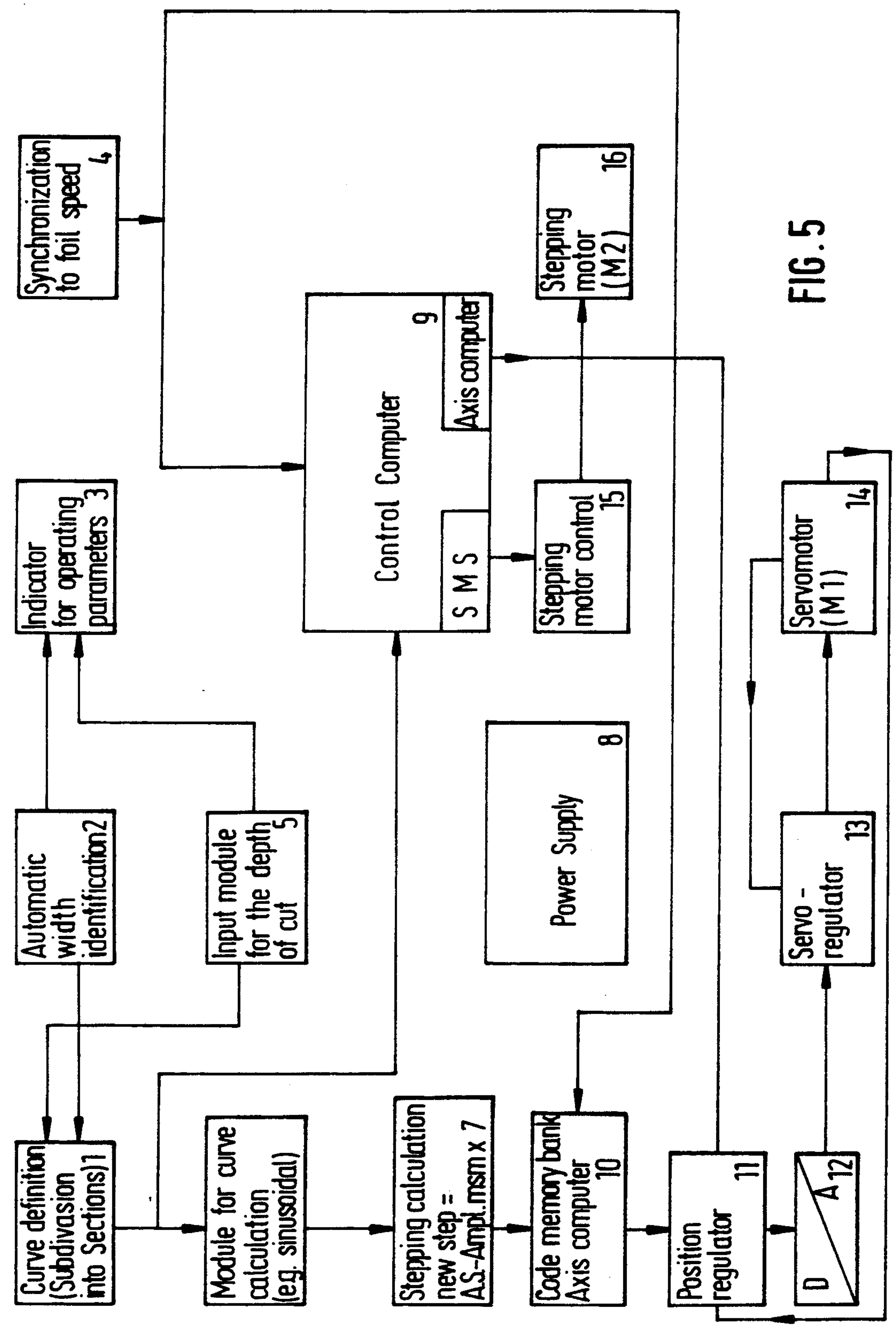
Figure 6:
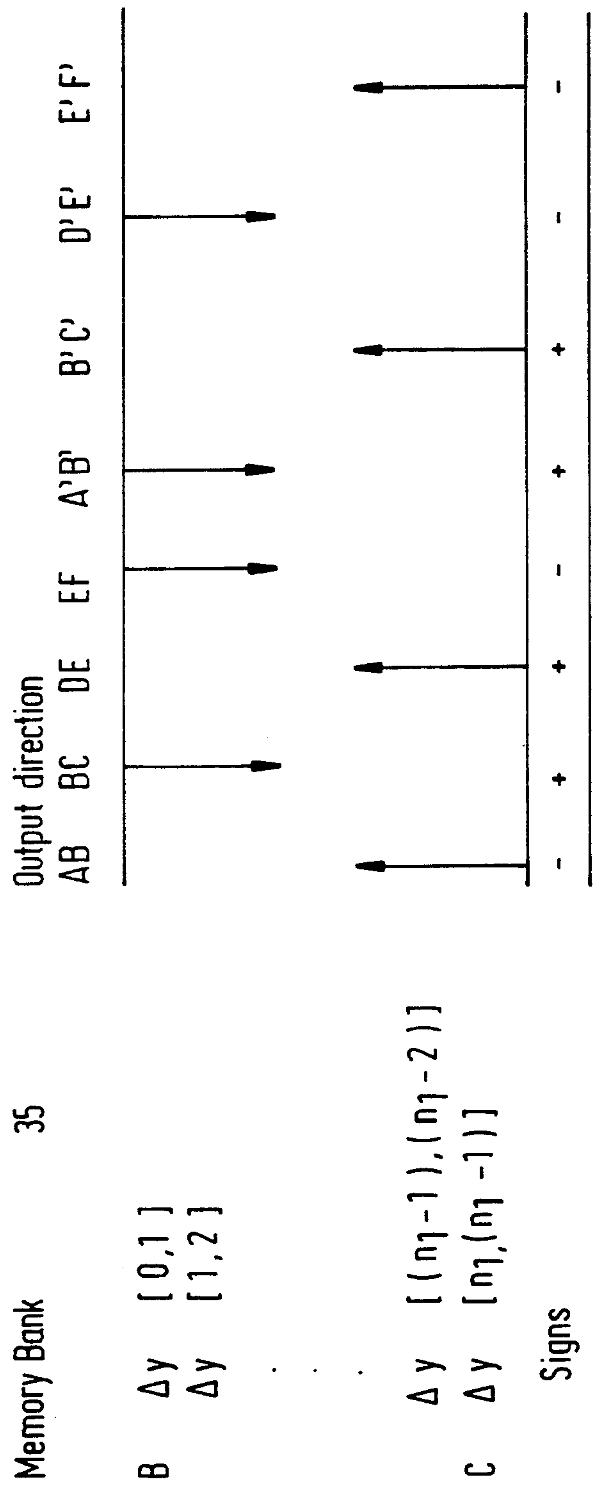

An embodiment is described in greater detail in the following with reference to the drawings, in which:

FIG. 1 is a curve path to be cut and composed of sinusoidal pieces and longitudinally extending straight lines as well as the path of the knife position, FIG. 2 is a top view onto the cutting device, FIG. 3 is a frontal view of the cutting device, FIG. 4 is a block diagram of the control circuit, FIG. 5 is a block diagram of a simplified version of the control circuit, and FIG. 6 is an output diagram of the second memory storing the transverse increments.

The embodiment of the invention concerns the manufacture of longitudinally extending, undulatory separating cuts which are composed of sinusoidal curve pieces and longitudinally extending straight lines. According to FIG. 1, the separating cut consists of a first sinusoidal curve piece AB, which extends in the fourth quadrant. The adjoining sinusoidal curve pieces BC extends in the first quadrant. A longitudinally extending straight line CD adjoings said sinusoidal curve piece. Said straight line passes over into the sinusoidal curve piece DE which extends in the first quadrant and which the sinusoidal curve piece EF adjoins, which extends in the fourth quadrant. The longitudinally extending straight line FA adjoins said curve piece EF. This undulatory separating cut has a dimension $W_o$ in longitudinal direction X. The dimension in transverse direction Y is 2U. Both $W_o$ and U are variable.

The X- component of the length of the sinusoidal curve piece AB+BC and DE+EF is $W_1$ in each case. The longitudinal dimension of the straight line CD is $W_2$ and of the straight line FA equal to $W_3$.

The ratio between the dimensions $W_1$, on the one hand, and the dimensions $W_2$ and $W_3$, on the other hand, is given in the undulatory separating cut.

The rotating position of the blade is illustrated by the curve path A', B', C', and D', E', F'. These curves correspond to the inclination of the tangents at curve path AA. If curve AA is defined as $y=f(x)$, then the curve A'A' corresponds to the function $y'=f'(x)$.

According to FIGS. 2 and 3, the cutting blade 20 is disposed on the shaft 21 of a motor 22 which is carried by a slide 23. The slide 23 is supported by guide rods 24, by means of which said slide can be shifted in transverse direction Y. An endless toothed belt 25 is fastened to slide 23 via a lock; on the one hand, said toothed belt is led over a guide pulley 19 and, on the other hand, over the shaft 26 of a motor 27. The tubing 28 to be cut moves below the guide rods 24 and slide 23 in direction of arrow 29. The direction of arrow 29 corresponds to the movement in direction of axis X, while the transverse movement of slide 23 corresponds to the movement in direction of axis Y. The first motor 27 thus determines the transverse movement of blade 20, whereas motor 22 determines its rotating position.

The control circuit has a first memory 30 in which the path of a sinusoidal curve piece from 0° to 90° is stored point-by-point in a unit scale in longitudinal direction X and in transverse direction Y. The total length $W_0$ of the desired separating cut AA is entered into a subdivider circuit 31 which determines the lengths of $W_1$, $W_2$ and $W_3$. This takes place on the basis of the given length ratios of $W_1$ to $W_2$ and to $W_3$. The value $W_2$ defines a number $n_2$ of equal increments $\Delta x$ in longitudinal direction, which are each allotted an increment $\Delta y=0$ in transverse direction. In the same way, the value $W_3$ defines a number $n_3$ of longitudinal increments $\Delta x$, each of which is allotted a transverse increment $\Delta y=0$. The rotating position $\alpha=0$ is allotted to each of the transverse increments $\Delta y=0$.

The value $W_1$ is entered into a divider circuit 32, where it is divided with the value of the longitudinal increment $\Delta x$. This results in a number of $2n_1$ of longitudinal increments $\Delta x$, as a result of which the length of the curve pieces AC and DF is defined in direction of the x-axis. This, therefore, means that each sinusoidal curve piece AB, BC, DE and EF is divided in direction of the x-axis in a number $n_1$ increments $\Delta x$.

As already mentioned, the path of a sinusoidal curve piece from 0° to 90° is stored point-by-point in a unit scale in memory 30, i.e. the longitudinal and transverse dimension is the number 1 respectively. This curve piece is now divided in longitudinal direction into a number of $n_1$ equal longitudinal pieces, each longitudinal piece is, therefore, $1n_1$ long. The adjacent storage data of the transverse dimensions are thereby continuously read out for each longitudinal piece and fed to an evaluation circuit 33. The storage data read out from memory 30 is illustrated by the solid vertical lines beside block 33 in FIG. 4. The evalutation circuit 33 now performs a linear interpolation for each longitudinal piece from the adjacent read storage data of the transverse dimensions. The interpolated values are shown by the vertically broken lines. In this way, the appropriate transverse dimension in the unit scale is obtained for each longitudinal increment $\Delta x$, said transverse dimension is multiplied with the amplitude value U, with which the actual transverse dimension y is obtained. This means that the corresponding value y is determined in transverse direction y for each longitudinal increment $\Delta x$.

The interpolated and multiplied values y of the respective transverse dimension are fed to an increment circuit 34, which forms the transverse increments $\Delta y$ from the successive values y. The thus determined transverse increments $\Delta y$ are successively stored in a second memory 35. This means that memory 35 stores the curve piece BC devided into increments, i.e. it is divided into a number $n_1$ equal longitudinal increments $\Delta x$, whereby the corresponding transverse increment $\Delta y$ is allotted to each longitudinal increment $\Delta x$ in memory 35, which have values which are different from one another.

The second memory 35 is connected to a motor control circuit 36 which, for its part, controls motor 27. Moreover, a synchronous and sequence circuit 37 is provided which is connected to the second memory 35 and with the motor control circuit 36.

The method of operation is as follows:

At point A, the synchronous and sequence circuit 37 generates a start signal which is fed to memory 35. After the start signal, this circuit 37 generates a number of $n_o$ impulses synchronously to the movement of web 28 in direction of arrow 29. During a first series of $n_1$ impulses, the increments $\Delta y$ stored in memory 35 are fed in a sequence, which is in but still with the same sign to the input sequence, to the motor control circuit 36, i.e. in direction from C to B corresponding to the path of the curve piece AB. During the next $n_1$ impulses, the increments $\Delta y$ are fed from memory bank 35 to the motor control circuit 36 in the same sequence and with the same sign as when entered, corresponding to the increment sequence $\Delta y$, which defines the curve piece BC. This takes place while the foil web 28 moves in direction of arrow 29 corresponding to the x-axis along a distance which corresponds to a number of $2n_1$ longitudinal increments of the respective length $\Delta x$. If the foil web has moved over a distance of $2n_1\Delta x$, then slide 23 remains in its last occupied position during the subsequent $n_2$ impulses, which corresponds to the run of the foil 28 over a distance of $n_2\Delta x$ corresponding to the straight line CD. Now, the synchronous and sequence circuit 37 feeds a further signal to memory 35, as a result of which, during the following $n_1$ impulses, the increments $\Delta y$ stored there are read out in a sequence which is in reverse order to the input sequence and with the same sign, corresponding to the curve piece DE. The foil 28 hereby moves in direction of arrow 29 by the amount $n_1\Delta x$. During the subsequent movement by the distance $n_1\Delta x$, during the subsequent $n_1$ impulses from memory 35, the transverse increments $\Delta y$ are fed to the motor control circuit 36, in the same sequence as for entering, but with reversed sign, corresponding to curve piece EF. At the end of this output, slide 23 has again assumed its original position along the guide rails 24. Foil 28 now moves, during the subsequent $n_3$ impulses, over a distance of $n_3\Delta x$, corresponding to the straight line FA, without thereby moving slide 23.

Memory 35 can also store the increments $\Delta y$ of the total curve path from A to C. These increments are then read out in the one sequence when the curve has to pass from A to C and in the other sequence, however, with reversed sign, when the curve has to pass from D to F.

To control the rotation of blade 20 by motor 22, the increments $\Delta y$, which are stored in the second memory 35, can also be used. If the curve piece AB is passed through, then the blade performs a rotation A'B', whereby the path of the rotation corresponds to a sinusoidal curve piece in the first quadrant. As a result, the increments are fed from memory 35 to the motor control circuit 38 during the first series of $n_1$ impulses in the same sequence and with the same sign as when entering. For the curve piece B'C', the increments are fed to the motor control circuit 38 during the next series of $n_1$ impulses in a sequence, which is in reverse to the sequence when entering but still with the same sign and during the subsequent $n_2$ impulses the increment is $\Delta y=0$. From D' to E', the output during the subsequent $n_1$ impulses takes place in the same sequence as when entering, however, with reverse sign, and from E' to F', during the then subsequent $n_1$ impulses in reverse sequence and with reversed sign. In the last $n_3$ impulses, the increment is then $\Delta y=0$.

A further circuit variant is shown in FIG. 5. It is used for cutting an already printed tubing foil web, in which a marking is printed at each of points A which is detected by a sensor 2. The period between two subsequent sensor signals at a known speed of web 28 in direction of arrow 29 renders the value $W_o$. The desired amplitude U is entered via an input module 5. Values $W_o$ and U are, on the one hand, fed to an indicator 3 for the operating parameters, on the other hand, to a subdivider circuit 1. This subdivider circuit corresponds to subdivider circuit 31 according to FIG. 3. In a module 6 for calculating curves, the number $n_1$ of the longitudinal increments $\Delta x$ are determined and the values read out from memory 30 are processed in transverse direction. Module 6 contains, therefore, the divider circuit 32, memory bank 30 as well as the evaluation circuit 33 according to FIG. 4. Block 7 corresponds to the increment circuit 34 and memory 10 to memory 35 according to FIG. 4. The data from memory 30 is fed to a position controller 11 and from there, via a digital-analog converter 12, to a servo-controller 13, which drives motor 27, which is illustrated by block 14. Servomotor 14 has a rotating position sensor whose output signals are fed back to the position controller 11. A desired/actual value comparison takes place in it, so that motor 14 always assumes its exact position which is determined by the signals of memory 10.

The values of U and $W_1$ as well as $W_2$ and, thus of $n_1$ are fed to a control computer 9 from subdivider circuit 1. Since it is not necessary that the blade 20 extends exactly tangentially to the curve to be cut, it is the object of this control computer 9 to generate triangular impulses as shown in FIG. 1 at A', B' and C' with broken lines. Their width is given by $n_1$ and their height by U. This control computer 9 controls the motor control circuit 15 corresponding to the motor control circuit 38 according to FIG. 4. This control circuit 15 controls the stepping motor 16, corresponding to the motor 22 according to FIGS. 2 to 4. The control computer 9 comprises an axis computer, which generates the above-noted start signal when sensor 2 has detected a marking which corresponds to point A. This start signal is fed to the position controller 11 which then reads the memory 10 during the following $2n_1$ impulses, as noted above. The axis computer also determines that, during the subsequent $n_2$ impulses, no signals are fed to the position regulator 11 and generates the further signal which, in turn, effects a reading of the memory 10 during the subsequent $2n_1$ impulses. The axis computer therefore corresponds to the circuit 37.

Moreover, a synchronization circuit 4 is provided which generates impulses synchronously to the foil speed. These impulses are fed to the control computer 9 and the memory 10. The synchronization circuit 4 synchronizes the output of the increments $\Delta y$ from the stepping memory 10 with the output of the signals from the control computer 9 into the motor control circuit 15.

Distance FA can be variable with respect to its length, since the distances between the printed markings are not always exactly the same. Length $W_3$ is only determined in the teach-in operation, during operation the appropriate number $n_3$ of longitudinal increments $\Delta x$ is left open. This means that, when detecting a printed marking, the curve will pass through from A to F as defined, thereafter the slide 23 and blade 20 will maintain their position without counting impulses $n_3$, until a printed marking is again detected, upon which the previously noted procedure repeats.

FIG. 6 shows the previously noted output sequence of the memory 35. For a movement of the foil web from point B to point $B+\Delta x$, the transverse increment $\Delta y$ (0.1) is stored, for a movement from point $B+\Delta x$ to $B+2\Delta x$, the increment $\Delta y$ (1.2) etc. is stored and, lastly, for the movement from point $C-\Delta x$ to point C, the transverse increment $\Delta y$ ($n_1$, $n_1-1$) is stored. The output sequence equal to this sequence is illustrated by the arrows pointing downward and the output sequence in reverse to this sequence is illustrated by arrows pointing upward. Moreover, the signs of the cross increments are given for each curve piece.

I claim:

1. A control circuit for controlling the linear transversal movement and the rotating movement of a blade for cutting repeating curves in a web moving in a longitudinal direction under the blade, whereby the blade being disposed approximately tangentially to the path of the curve to be cut, comprised of
   a. a first motor for controlling the movement of the blade, in a direction transversal to said longitudinal direction and a second motor moved together with the blade for controlling the rotation of the blade,
   b. a first memory in which the path of at least one curve piece is stored which path in longitudinal and lateral direction is proportional to the path of repeating curve pieces of the curve to be cut,
   c. a divider circuit for subdividing the longitudinal dimension of the repeating curve pieces into equal longitudinal increments and the longitudinal dimension of the stored curve piece into an equal number of longitudinal pieces,
   d. an evaluation circuit for determining for each subdivision of the stored curve piece the storage data in the transversal direction,
   e. an increment circuit for generating a transversal increment from each of successive storage data in the transversal direction,
   f. a second memory for storing the transversal increment of each longitudinal increment,
   g. a control computer for generating, in an approximating manner, the first mathematic derivative of the path of the stored curve piece,
   h. means for recalling synchronously to the longitudinal travel of the web for each longitudinal increment in the sequence corresponding to the path of the repeating curve pieces, the stored transversal increments controlling the first motor and the values of the first derivative curve for controlling the second motor.

2. A control circuit according to claim 1, in which the stored curve piece is stored point-by-point in the first memory, and, for each subdivision of the stored curve piece, the evaluation circuit interpolates the storage data adjacent thereto and feeds the interpolated values to the increment circuit.

3. A control circuit according to claim 2, in which the curve piece which is stored point-by-point in the first memory is stored in longitudinal and transversal direction in unit scale, the evaluation circuit multiplying the interpolated values with the transversal dimension of the repeating curve pieces and the control computer also multiplies the first derivative curve with the transversal dimension.

4. A control circuit according to claim 2, in which the evaluation circuit linearly interpolates adjacent storage data.

5. A control circuit according to claim 1, further including a subdivider circuit which, for longitudinal straight lines of the curve, generates a transversal increment zero for each longitudinal increment, this transversal zero increment determines a zero rotating position of the second motor during the cut of the straight lines.

6. A control circuit according to claim 1, further including a sequence control for issuing the transversal increments stored in the second memory for controlling the first motor in reverse order and with reversed sign for point-symmetric curve pieces, in reverse order and with the same sign for axisymmetric curve pieces with respect to an axis in lateral direction and in the same order and reversed sign for axisymmetric curve pieces with respect to an axis in longitudinal direction.

7. A control circuit according to claim 6, in which with a sinusoidal or cosinusoidal path of the stored curve piece, the sequence control issues the transversal increments stored in the second memory for controlling the second motor in a manner corresponding to the first mathematical derivative of that sinusoidal or cosinusoidal path.

8. A control circuit according to claim 6, in which the sequence control synchronizes the output of the transversal increments with the speed of the web to be cut.

9. A control circuit according to claim 6, in which the subdivider circuit feeds, to the sequence control, signals corresponding to the zero values of the transversal increments and of the rotation position as well as a signal which corresponds to the number of longitudinal increments corresponding to the length of the straight lines and in which the sequence control stops the motors when said straight lines appear.

10. A control circuit according to claim 9, in which the end of the curve is formed by a longitudinal straight line, the web has markings which determine the respective start of the curve, further comprising a sensor for detecting said markings, signals of sensor being fed to the sequence control, said signals determining the start of the drive feed to each of the motors and the straight line being determined at the end of the curve with its end by detecting a marking.

* * * * *